US005104671A

United States Patent [19]

Wellman

[11] Patent Number: 5,104,671

[45] **Date of Patent: * Apr. 14, 1992**

[54] WHEAT MILLING PROCESS

[75] Inventor: Warner Wellman, Omaha, Nebr.

[73] Assignee: ConAgra, Inc., Omaha, Nebr.

[ * ] Notice: The portion of the term of this patent subsequent to Feb. 18, 2009 has been disclaimed.

[21] Appl. No.: 610,819

[22] Filed: Nov. 8, 1990

Related U.S. Application Data

[63] Continuation-in-part of Ser. No. 557,631, Jul. 24, 1990.

[51] Int. Cl.[5] .................... A23P 1/00

[52] U.S. Cl. .................... 426/483; 426/507; 426/622

[58] Field of Search .................... 426/481, 483, 622, 518; 241/159, 13; 99/518, 528, 607, 617

[56] References Cited

U.S. PATENT DOCUMENTS

| | | | |
|---|---|---|---|
| 421,575 | 2/1890 | Johnson | 426/483 |
| 503,889 | 8/1893 | Williamson | 99/617 |
| 677,587 | 7/1901 | Nagel | 426/482 |
| 721,649 | 2/1903 | Pendleton | 99/617 |
| 2,379,677 | 7/1945 | Borsakovsky | 426/483 |
| 2,392,365 | 1/1946 | Carter | 241/159 |
| 2,651,470 | 9/1953 | Dodds et al. | 99/617 |
| 2,867,256 | 1/1959 | Earle | 426/482 |
| 3,667,523 | 6/1972 | Lynn et al. | 426/481 |
| 3,703,200 | 11/1972 | Palyi | 426/483 |
| 3,945,312 | 3/1976 | Borisov et al. | 99/605 |
| 3,960,068 | 6/1976 | Salete | 99/607 |
| 3,979,375 | 9/1976 | Rao et al. | 426/483 |
| 4,052,518 | 10/1977 | Borisov et al. | 426/483 |
| 4,292,890 | 10/1981 | Salete-Garces | 99/607 |
| 4,324,175 | 4/1982 | Satake | 99/528 |
| 4,421,772 | 12/1983 | Munck | 426/231 |
| 4,426,921 | 1/1984 | Meinardus | 99/617 |
| 4,505,196 | 3/1985 | Beisel | 99/519 |
| 4,583,455 | 4/1986 | Salete-Garces | 99/607 |
| 4,741,913 | 5/1988 | Satake | 426/483 |
| 4,829,893 | 5/1989 | Satake | 99/519 |
| 4,843,957 | 7/1989 | Satake | 99/617 |
| 4,896,592 | 1/1990 | Satake | 99/528 |
| 5,025,993 | 6/1991 | Satake | 241/74 |

FOREIGN PATENT DOCUMENTS

| | | |
|---|---|---|
| 218012 | 4/1987 | European Pat. Off. . |
| 295774 | 12/1988 | European Pat. Off. . |
| 373274 | 6/1990 | European Pat. Off. . |
| 2803527 | 10/1978 | Fed. Rep. of Germany . |
| 778710 | 3/1935 | France . |
| 640750 | 1/1984 | Switzerland . |

OTHER PUBLICATIONS

REMO, Rice Whitener Machine VERTIJET VJ III–Instructions Manual.

REMO Mexico, VERTIJET VJIII, Grain Sheller and Polisher Brochure.

Detection and Localization of Phenolic Compounds in Cereal Grains Using Computerized Microspectrophotometry Fulcher et al.

Determination of Ferulic Acid in Grain by HPLC and Microspectrofluorometry–Wetzel et al., G. Charalambous, Frontiers of Flavor, Proceedings of the 5th International Flavor Converence, Porto Karras, Chalkidiki, Greece, 1–3 Jul. 1987, 1988 Elsevier Science Publishers B.V. Amsterdam, Printed in the Netherlands, pp. 409–429.

(List continued on next page.)

*Primary Examiner*—George Yeung

*Attorney, Agent, or Firm*—Willian Brinks Olds Hofer Gilson & Lione

[57] ABSTRACT

Milling quality soft and hard wheat is milled by first removing germ and outer bran layers and germ, amounting to approximately 6% of the weight of the wheat in a vertrical pearler. The pearled wheat is then milled in a conventional roller mill to produce flour and farina. Unexpectedly high yields have been observed, and the process yields a milled product which is unusually low in pericarp cell wall fragments for a given ash content and high in aleurone content. An unusually high proportion of the total food grade product is low ash product.

79 Claims, 10 Drawing Sheets

OTHER PUBLICATIONS

Fluorescence Detection and Measurement of Ferulic Acid in Wheat Milling Fractions by Microscopy and HPLC–Pussayanawin et al. J. Agric Food Chem. 1988, 36, 515–520, 1988 American Chemical Society.

The Botanical Constitutents of Wheat and Wheat Milling Fractions by Autofluoresence–Jensen et al., American Association of Ceral Chemists., vol. 59, No. 6, 1982, pp. 477–484.

Inside Cereals–A Fluorescence Microchemical View–Fulcher et al. Ottawa Research Station Agriculture Canada, Ottawa, Ontario Canada.

A Technique to Improve Functionality of Flour from Sprouted Wheat Liu et al. (Including Abstract), Cereal Foods World, Jul. 1986, vol. 31, No. 7, pp. 471–476.

The Influence of Wheat Endospern on Flour Color Grade–Barnes, Journal of Cereal Scient 4 (1986) 143–154.

Differentiation of Wheat Based on Fluorescence, Hardness and Protein–Irving et al., Cereal Chemistry, vol. 66, No. 6, 1989 pp. 471–476.

Analysis of Botanical Components in Cereals and Cereal Products a New Way of Understanding Cereal Processing–Munch et al., Carlsberg Research Laboratory, Copenhagen, pp. 27–40.

Isolation of Gluten and Starch from Ground, Pearled Wheat Compared to Flour. Q. Zhuge et al., Department of Grain Science and Industry Shellenberger Hall, Kansas State University, Manhattan, Kansas (Abstract).

Effect of Scouring on Microflora of Durum Wheat–Spicher, Journal Article, 1983, pp. 185–189.

Article, "Debranning Process is New Approach to Wheat Milling" *World Grain*, Jul./Aug. 1990, pp. 2814 32.

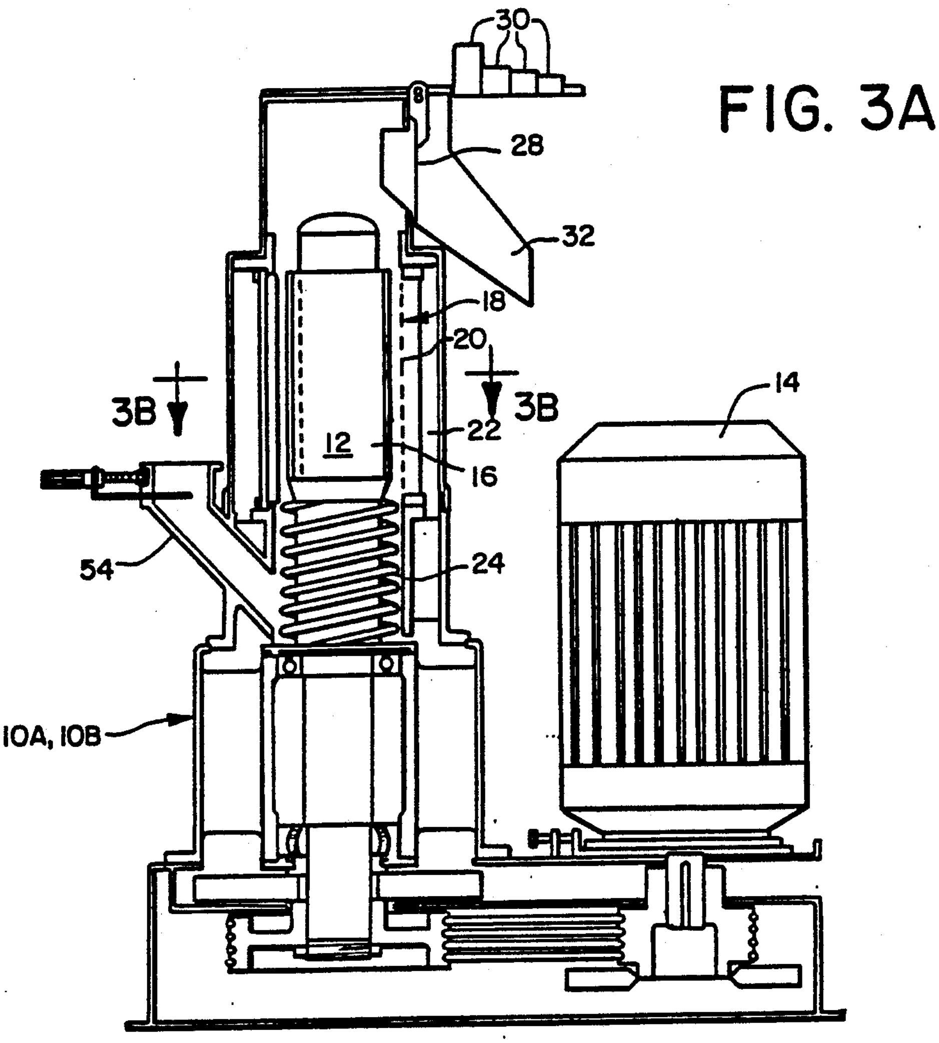
FIG. 3A
FIG. 3B
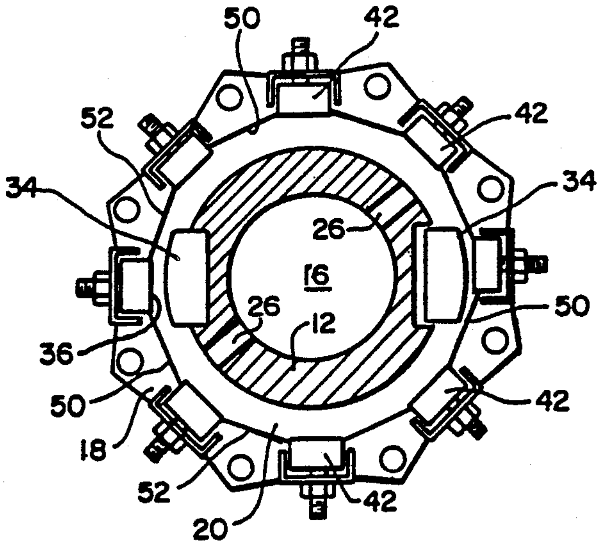

Percent Extraction
Soft Wheat Cumulative Ash Curves

Percent Extraction
Hard Wheat Cumulative Ash Curves

WHEAT MILLING PROCESS

CROSS REFERENCE TO RELATED APPLICATION

This application is a continuation in part of copending U.S. patent application Ser. No. 07/557,631, filed Jul. 24, 1990, which is hereby incorporated by reference.

BACKGROUND OF THE INVENTION

This invention relates to an improved wheat milling process for converting wheat into a finely divided milled product such as flour and/or farina, and to the improved milled wheat product produced thereby.

Conventionally, wheat is milled in roller mills which simultaneously (1) remove outer bran layers and germ from the wheat kernel or berry and (2) reduce the size of the starchy endosperm. A typical roller mill will include a sequence of counter-rotating opposed rollers which progressively break the wheat into smaller and smaller sizes. The output from each pair of rollers is sorted into multiple streams, typically by means of sifters and purifiers, to separate the bran and germ from the endosperm, and to direct coarser and finer fractions of the endosperm to appropriate rollers. *Principles of Cereal Science and Technology,* R. Carl Hoseney (The American Association of Cereal Chemists, Inc., 1986), describes the operation of a conventional roller mill at pages 139–143.

Such conventional roller mills reduce the size of the bran and germ simultaneously as they reduce the size of the endosperm. For this reason, the bran, germ and endosperm fragments are intimately mixed together, and portions of the endosperm inevitably remain with the bran and germ when the bran and germ are removed. This of course reduces milling efficiency and increases the cost of the final milled product.

Bran is also conventionally removed from cereal grains such as rice, barley and wheat by means of pearling machines. For example, Salete U.S. Pat. No. 3,960,068 and Salete-Garces U.S. Pat. Nos. 4,292,890 and 4,583,455 describe grain polishing and whitening machines which are indicated as being particularly suitable for polishing and whitening rice. These devices process dehusked rice to remove outer bran layers from the rice without breaking the endosperm by forcing the rice upwardly in an annular column between two sets of opposed abrasive elements. The inner set of abrasive elements rotates with respect to the outer, and rice in the region of the abrasive elements is fluidized by a radially outwardly directed air flow. Bran and removed flour from the rice pass radially outwardly and are thereby separated from the polished endosperm.

Pearling has been used to improve the flour obtained from germinated wheat. See "A Technique to Improve Functionality of Flour from Sprouted Wheat," R. Liu, et al., Cereal Foods World, Vol. 31, No. 7, pp. 471–476 (July, 1986). This article describes a process for pearling germinated wheat or a blend of germinated and sound wheat in a Strong Scott Laboratory Barley Pearler before the pearled wheat is milled in a roller mill to produce flour. Pearling was used to remove damaged tissue resulting from germination, thereby improving flour quality. As discussed at page 474, pearling removed the germ from about one half of the germinated kernels but from only 3% of the sound kernels in a blend of germinated and sound wheat.

Wheat flour and farina are milled in very large quantities, and any improvement in milling efficiency or in quality of the milled product will result in major cost savings.

SUMMARY OF THE INVENTION

It is a primary object of this invention to provide an improved wheat milling process which provides an increased yield as compared with conventional roller milling processes (i.e., a greater percentage of the incoming wheat is milled to a finely divided product at a given ash content).

It is another object of this invention to provide an improved wheat milling process which reduces operating and capital costs per unit of production as compared with prior art roller milling processes.

It is another object of this invention to provide an improved wheat milling process that provides a higher throughput of milled product of a given ash and/or color content for a mill of a given capital cost, as compared with prior art roller milling processes.

It is another object of this invention to provide a improved milled wheat product which retains more of the aleurone layer than prior milled wheat products for a given ash and/or color content.

According to the process of this invention, a quantity of milling quality hard or soft wheat having an endosperm and a germ surrounded by a plurality of bran layers is milled. At least about 5% of the initial weight of the wheat is removed from the wheat without substantially reducing the average size of the endosperm by passing the wheat between two sets of abrasive elements while flowing a gas through the wheat and moving the two sets of abrasive elements with respect to one another, thereby forming a reduced bran pearled wheat. The average size of the pearled wheat is then progressively reduced by passing it through a sequence of multiple roller mills to form a finely divided final product at a plurality of roller mills in the sequence. Additional portions of the remaining bran layers are removed during this size reducing step.

By removing a sufficient portion of the outer bran layers in the initial bran removing step, the resulting finely divided milled soft wheat product will (1) constitute at least about 72.5 weight percent of the initial quantity of wheat, and (2) will have an ash content of no more than about 0.45±0.02 weight percent. Those skilled in the art will recognize that this represents an unusually high yield.

By removing a sufficient portion of the outer bran layers in the initial bran removing step, the resulting finely divided milled hard wheat product will (1) constitute at least about 75 weight percent of the initial quantity of wheat, and (2) will have an ash content of no more than about 0.50±0.02 weight percent. Those skilled in the art will recognize that this represents an unusually high yield.

Another aspect of this invention is that the milling process described above can be used with soft wheat to cause the ratio of (1) the weight of the soft wheat short patent stream to (2) the weight of the soft wheat total food grade stream to exceed 50%. Those skilled in the art will recognize that this represents an unusually high percentage of low ash product. When the milling process described above is used with hard wheat, the ratio of the weight of the hard wheat medium patent stream to the weight of the hard wheat total food grade stream can be made to exceed 85%. Once again, this represents an unusually high fraction of low ash product.

The process of this invention can be used to produce an improved finely divided food grade soft or hard wheat product having an unusually high ratio of measured aleurone fluorescence area to ash content. This is because the outer bran layers (pericarp) have been removed while leaving an unusually large fraction of the aleurone layer with the endosperm.

The milling process and product of this invention provide significant advantages. In particular, the milling process described below provides a substantially higher yield for a given ash content of the final product. This is believed to be at least in part because (1) a larger fraction of the aleurone layer remains with the endosperm and is not removed with the outer bran layers and (2) the removed bran carries with it less flour. The milling process described below also reduces the energy costs per unit output as well as the capital costs per unit output. All of these advantages are achieved without reducing the quality of the resulting milled wheat product. As pointed out below, food tests show that wheat flour made with the process described below is equal to wheat flour milled in the conventional manner, and bacteria counts have been found to be lower.

The invention itself, together with further objects and attendant advantages, will best be understood by reference to the following detailed description, taken in conjunction with the accompanying drawings.

BRIEF DESCRIPTION OF THE DRAWINGS

FIG. 3A is a partial sectional view of one of the bran removal machines of FIG. 2.

FIG. 3B is a cross-sectional view taken along line 3B—3B of FIG. 3A.

DETAILED DESCRIPTION OF THE PRESENT PREFERRED EMBODIMENTS

Figure 1:
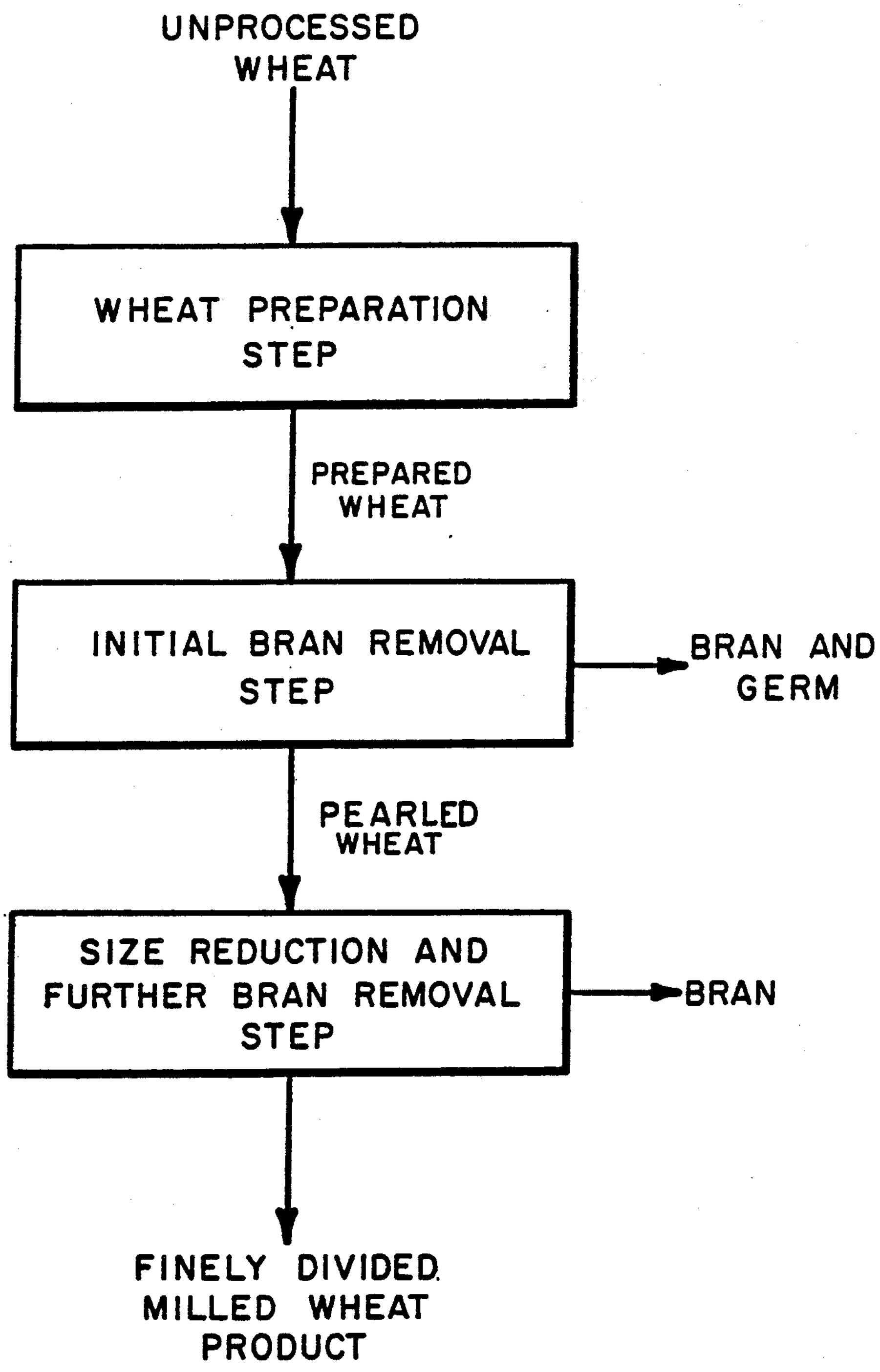
FIG. 1 is a flow chart of a presently preferred embodiment of the milling process of this invention.

The following section defines terms that are used in this specification and the following claims. Subsequent sections describe in detail the presently preferred embodiments of the milling process and product of this invention, and then provide examples.

DEFINITIONS

Wheat—The term wheat is intended to include the species and varieties of wheat commonly grown for cereal grain, including durum, red durum, hard red, white and soft red wheat, including both spring wheat and winter wheat. The wheat kernel or berry is commonly defined as having a seed surrounded by a pericarp. The seed in turn includes a germ, an endosperm and a seed coat. The endosperm includes a starchy endosperm which makes up the large body of the kernel and an aleurone layer which surrounds the starchy endosperm. The seed coat in turn surrounds the aleurone layer. In conventional milling the aleurone layer is removed with the seed coat and the pericarp in what is commonly termed bran. Nevertheless, the aleurone layer is classified from the botanical standpoint as a part of the endosperm. Further details regarding wheat structure can be found in standard reference books, as for example at pages 1-14 of *Principles of Cereal Science and Technology* identified above.

Milling Quality Wheat—A wheat characterized by a small fraction of germinated or otherwise damaged kernels and classified as US #2 or better in the classification scheme of 7 CFR §810 will be referred to as milling quality wheat.

Drum Wheat—Durum wheat encompasses all durum wheats, including hard amber durum, amber durum, and durum wheat.

Hard Wheat—Hard wheat encompasses all hard wheats, including hard red winter and hard red spring wheat.

Soft Wheat—Soft wheat encompasses all soft wheats, including soft red and soft white wheat.

Ash Content—Wheat has an ash or mineral content which is not distributed evenly in the grain. In general, the inner endosperm is relatively low in ash while the outer bran layers are relatively high in ash. For this reason, ash content is a convenient assay for the presence of bran in flour, and ash is commonly measured as an assay of flour quality. Generally speaking, this is done by heating a measured weight of milled wheat product in the presence of oxygen and weighing the resulting ash as set forth in AACC Methods No. 08-01 and 08-02.

Soft Wheat Streams or Products—Finely divided milled soft wheat products such as flour and farina will be identified as follows depending on ash content:

| Name | Ash Content (wt %)(+/− 0.02) |
|---|---|
| soft wheat short patent stream or product | ≦.35 |
| soft wheat patent stream or product | ≦.40 |
| soft wheat total food grade stream or product | ≦.45 |

The soft wheat total food grade stream or product represents the total mill output of food grade, finely divided milled wheat product, and may have an ash content less than 0.45±0.02 wt %, depending on the milling process.

Hard Wheat Streams or Products—Finely divided milled hard wheat products such as flour and farina will be identified as follows depending on ash content.

| Name | Ash Content (wt %)(+/− 0.02) |
|---|---|
| hard wheat medium patent stream or product | ≦.40 |
| hard wheat patent stream or product | ≦.45 |
| hard wheat total food grade stream or product | ≦.60 |

The hard wheat total food grade stream or product represents the total mill output of food grade, finely divided milled wheat product, and may have an ash content less than 0.50±0.02 wt %, depending on the milling process.

Measured Aleurone Fluorescence Area—The aleurone layer has distinctive fluorescence properties as compared with other portions of the wheat kernel. These fluorescence properties can be used to determine the amount of aleurone in a sample of finely divided wheat product. This is done by microscopically scanning a sample of wheat product in reflected light, (for example using an NIR sample holder) using illumination at 365 nanometers which excites aleurone cell wall fragments to fluoresce distinctively. The area to be scanned is preferably about 1 centimeter by 1 centimeter and the fluorescence monitoring system is standardized against a stable fluorophore such as uranyl glass. The percentage of the total scanned area which exhibits fluorescence characteristic of aleurone is then determined, preferably using automated scanning techniques. In this way the measured aleurone fluorescence area is determined as a percentage of the total scanned area. Further details are set out below in conjunction with Example 3.

PREFERRED EMBODIMENT

FIG. 1 shows a general overview of the presently preferred milling process of this invention. In broad outline, unprocessed wheat is first cleaned in substantially the conventional manner. The cleaned wheat is then passed through bran removal machines to remove most of the bran and germ without reducing the size of the endosperm, thereby forming pearled wheat. The pearled wheat is then applied as a feedstock to a roller mill that removes additional bran and reduces the size of the endosperm to form a finely divided milled wheat product such as flour and farina.

Figure 2:
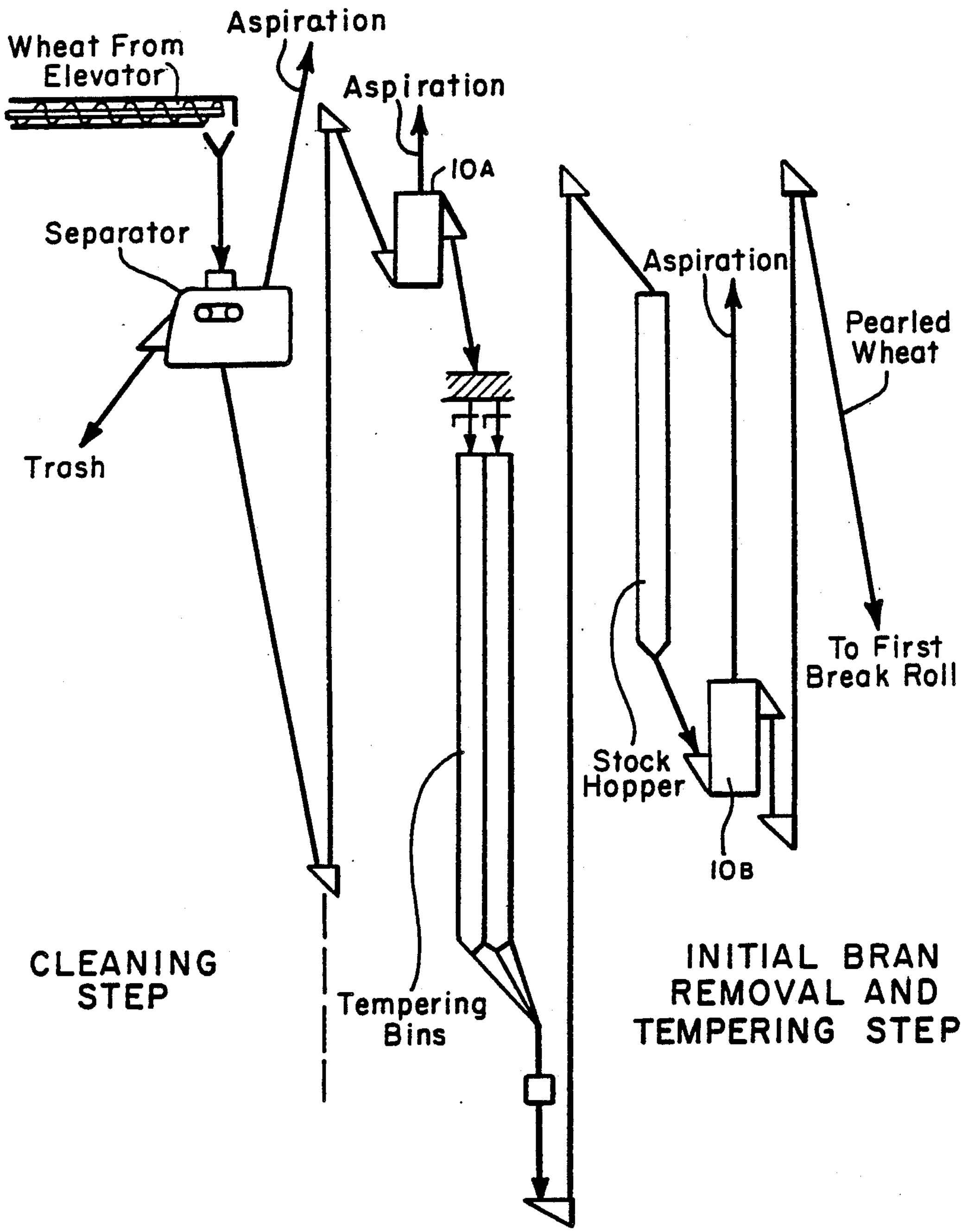
FIG. 2 is a mill flow diagram of the wheat cleaning and initial bran removal steps of FIG. 1.

In the milling process of FIG. 1, the first step of cleaning the wheat for milling is made up of essentially of a trash removal step. As shown in FIG. 2, incoming wheat from the elevator is passed through a Carter milling separator that operates in the conventional manner to remove trash from the incoming wheat. The cleaned wheat is then passed to the initial bran removal and tempering step.

FIG. 2 shows in block diagram form the principal steps of the initial bran removal and tempering step. As shown in FIG. 2 the wheat is first passed through a first bran removal machine 10A, which operates to remove initial bran layers. The partially pearled wheat from the first bran removal machine 10A is then transported via a tumbling conveyor to a tempering bin. Water is added to the wheat in the conveyor and the wheat is tempered preferably for about 4 hours until it reaches a moisture content of about 14.5 wt % (soft wheat) or 15.0 wt % (hard wheat). This short tempering time is possible because outer bran layers are removed by the machine 10A prior to tempering. After the partially pearled wheat has been tempered it is then transferred via a lift to a stock hopper, and from the stock hopper to a second bran removal machine 10B. As described below, the two bran removal machines 10A, 10B are identical, and the output of the second bran removal machine 10B is the fully pearled, tempered wheat which is then applied as a feedstock to a size reduction and further bran removal step. As described in detail below, this step employs conventional roller mills, sifters and purifiers to reduce the size of the pearled wheat to the desired range as appropriate for flour, farina and other finely divided milled wheat products.

The resulting finely divided milled wheat product can then be further processed in any suitable manner, for example to enrich the product. The present invention is not concerned with such further processing steps, which may be selected as appropriate for the specific application.

The following sections provide further details regarding the presently preferred systems for implementing the initial bran removal and tempering step and the size reduction and further bran removal step of FIG. 1.

INITIAL BRAN REMOVAL STEP

As shown in FIG. 2, during the initial bran removal and tempering step the cleaned wheat is passed in sequence through two bran removal machines 10A, 10B. FIG. 3A shows an elevational view of one of the machines 10A, 10B, and FIG. 3B shows a cross-sectional view thereof. Referring to these figures, each of the bran removal machines 10A, 10B includes a central rotor 12 which is mounted for rotation about a vertical axis driven by an electric motor 14. The rotor 12 is hollow and defines a central passageway 16. The upper part of the rotor 12 is surrounded by a basket 18, and an annular treatment chamber 20 is formed between the rotor 12 and the basket 18. The basket 18 is in turn surrounded by a housing to define a bran removal passageway 22 immediately around the basket 18.

The lower end of the rotor 12 defines helical conveyor screws 24 which convey wheat upwardly into the treatment chamber 20 when the rotor 12 is rotated. The upper end of the rotor 12 defines an array of openings 26 interconnecting the central passageway 16 and the treatment chamber 20 (FIG. 3B). The upper portion of the treatment chamber 20 communicates with an outlet gate 28 that is biased to the closed position shown in FIG. 3A by weights 30. Wheat which has been moved upwardly through the treatment chamber 20 lifts the outlet gate 28 and exits the bran removal machine via an outlet chute 32.

Figure 4A:
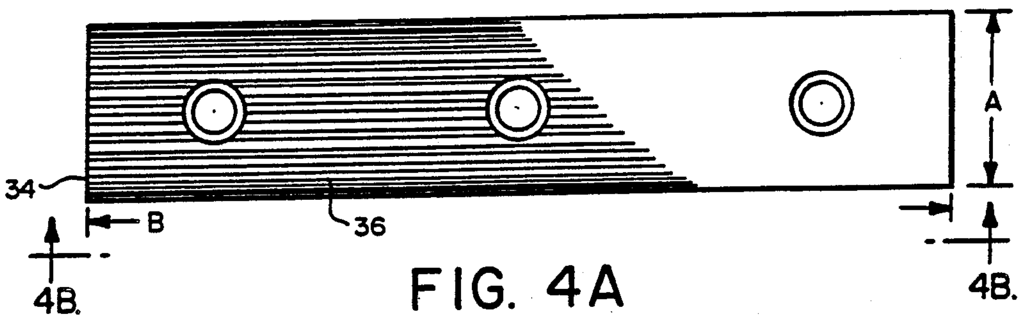
FIGS. 4A through 4I are detailed views of the abrasive elements shown in FIG. 3B.
Figure 4B:
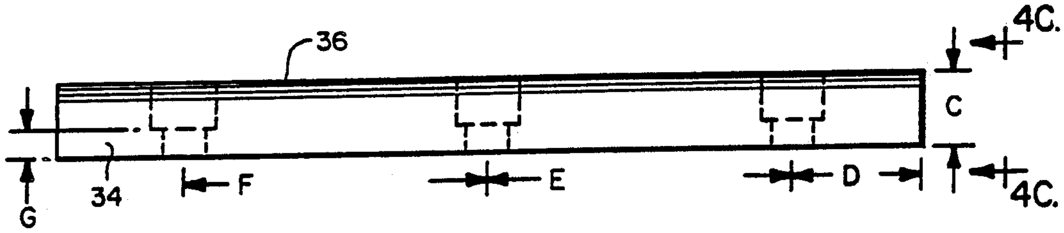
Figure 4C:
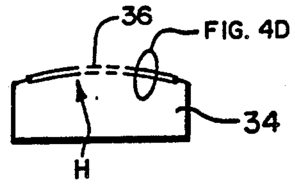
Figure 4D:
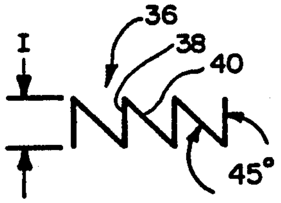
Figure 4E:
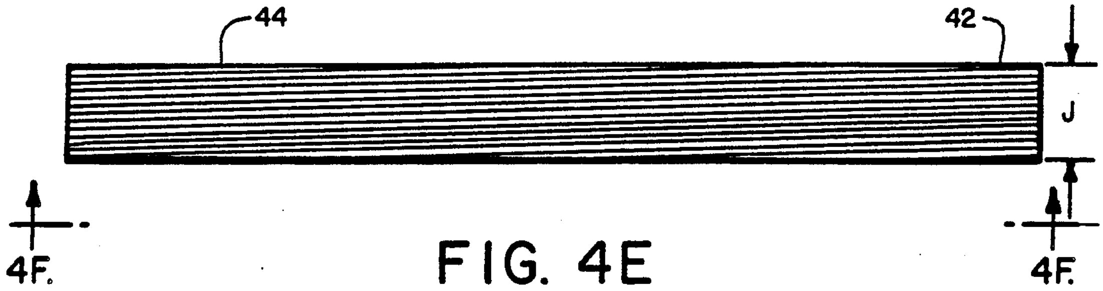
Figure 4F:
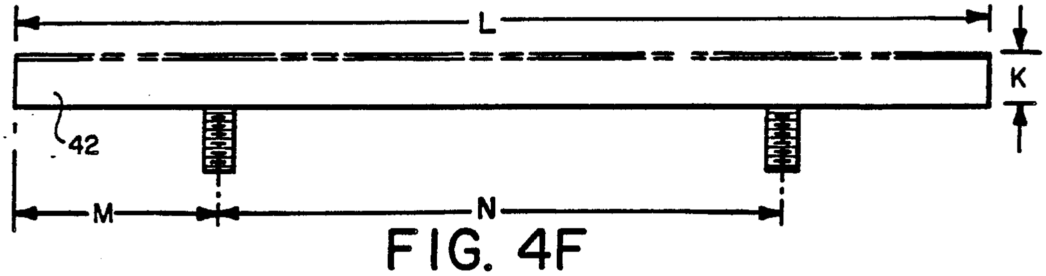
Figure 4G:
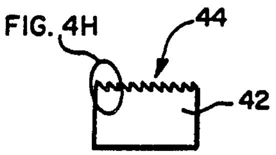

As best shown in FIG. 3B, the upper portion of the rotor 12 supports two radially opposed inner abrasive elements 34. FIGS. 4A–4D provide further details of the inner abrasive elements 34, which define an array of teeth 36 on the outermost portion situated to contact the wheat being treated. Preferably, the teeth 36 are sawtooth in configuration as shown in FIG. 4D, and each tooth defines a sharp face 38 and a dull face 40, with an included angle of 45°. The crest to crest spacing between adjacent teeth is in this embodiment approximately 1/16 inch. The inner abrasive elements 34 on the rotor 12 are rotated within the basket 18 by the motor 14.

Figure 4H:
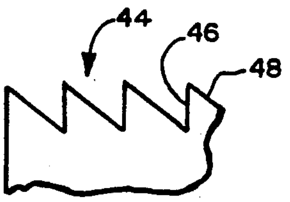
Figure 4I:
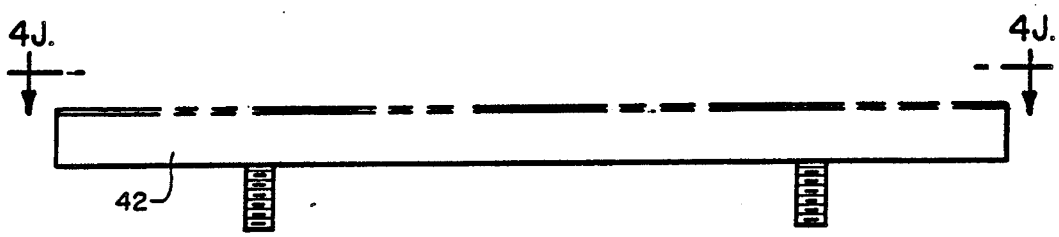
Figure 4J:
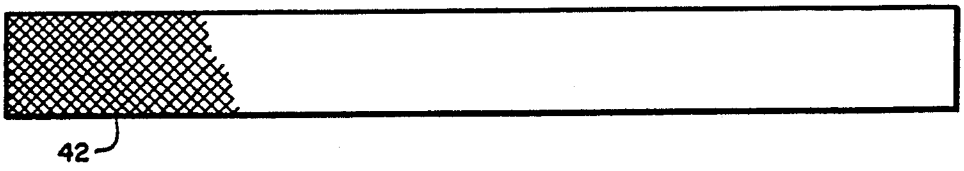

The basket 18 mounts an array of outer abrasive elements 42, which can be formed as shown in FIGS. 4E–4H or in FIGS. 4I–4J. In either case, the outer abrasive elements 42 define teeth 44 having a sharp face 46 and a dull face 48 as shown in FIG. 4H. The teeth 44 are preferably identical in configuration to the teeth 36 described above. In the embodiment of FIGS. 4E–4H, the teeth 44 are arranged in a helix which advances circumferentially about ¼ of an inch over a length of 12 inches. Alternately, the teeth in the outer abrasive elements 42 can be double cut at 45° as shown in FIGS. 4I and 4J.

Simply by way of example, the abrasive elements 38, 42 can be formed of a steel such as RYCROME 4140 or equivalent, case hardened to a Rockwell hardness of 48 on the C scale in a layer ⅛–3/16 inch thick. A suitable hardening process is to heat the abrasive elements 34, 42 to a temperature of 800°–900° F. and then to quench them in oil at a temperature of 200° F. Table I provides presently preferred dimensions for the abrasive elements 34, 42.

TABLE I

Preferred Dimensions as Shown in FIGS. 4A–4H

| Reference Symbol | Preferred Dimension (Inches) |
|---|---|
| A | 2 3/8 |
| B | 11 3/4 |
| C | 1 |
| D | 1 3/4 |
| E | 4 1/8 |
| F | 4 1/8 |
| G | 7/8 |
| H | 3 1/4 |
| I | 0.050 |
| J | 1 5/16 |
| K | 3/4 |
| L | 13 1/4 |
| M | 2 13/16 |
| N | 7 5/8 |

As shown in FIG. 3B, screens 50 are interposed between the outer abrasive elements 42, and the screens 50 define diagonally situated slots 52. Preferably, the screens 50 are formed of a material such as 20 gauge carbon steel, and the slots 52 are oriented at an angle of 45° and have a size of about 1 millimeter by 12 millimeters.

The bran removal machines 10A, 10B described above operate as follows. Wheat is introduced into the machine 10A, 10B via an input chute inlet 54 into the annular region around the conveyor screws 24. The rotor 12 is rotated by the motor 14 and the conveyor screws 24 advance the wheat upwardly into the treatment chamber 20, where the wheat is abraded between the inner and outer abrasive elements 34, 42 and against the screens 50. Preferably, the elements 34, 42 are oriented such that the sharp faces 38 approach the dull faces 48 as the rotor 12 is rotated. During this process a suction is drawn on the bran removal passageway 22 causing a substantial air flow through the openings 26 and the treatment chamber 20 out the screens 50 into the bran removal passageway 22. This air flow fluidizes the wheat in the treatment chamber 20 and removes bran particles from the flow of wheat. After treatment, the wheat moves upwardly out of the treatment chamber 20, opens the outlet gate and then falls out the outlet chute 32.

A modified version of the bran removal machine sold by Refaccionari de Molinas, S. A., Mexico City, Mexico under the trade name REMO Vertijet Model VJIII has been found suitable for use in this process. In particular, this bran removal machine has been operated at a rotor speed between 800 and 1800 rpm and preferably about 1300 rpm using a 40 horsepower motor. The minimum separation between the inner and outer abrasive elements 34, 42 is preferably adjusted to 7 mm. The airflow through the bran removal machine is 500–600 SCFM and the weights 30 total 12 pounds. The preferred bran removal machine 10 is a modified version of the Vertijet device described above in that the original equipment screens and the abrasive elements have been replaced with the elements 50, 34, 42 described above. Additionally, a ground strap has been provided between the upper and lower housings to reduce problems associated with static electricity in the area of the outlet chute 32. Further details on the Vertijet bran removal machine can be found in U.S. Pat. No. 4,583,455.

In operation, the weights 30 are selected to cause the machines 10A,10B to remove as much bran and germ as possible without reducing the size of the wheat endosperm. Generally at least about 5 wt %, and generally 6 wt % of the wheat supplied to the bran removal machines 10A, 10B is removed. Microscopic examination at 30× reveals that the large majority of bran and germ is removed from the wheat in the initial bran removal step. Visual inspection shows that the germ is generally removed from more than 50% (and often about 75%) of the grains of wheat. The machines 10A, 10B have a high capacity, and throughput rates of 80–180 bushels per machine per hour for each of the machines 10A and each of the machines 10B have been achieved.

The machines 10A, 10B may be further modified to further improve performance. For example all but two of the screens 50 may be replaced with imperforate plates or further abrasive elements and the air flow through the machine 10A, 10B may be reduced by two-thirds. This approach increases the amount of separated bran that remains with the pearled wheat, and a conventional turbo aspirator such as an OCRIM 600 can be used to separate bran from the pearled wheat downstream of the machine 10A, 10B.

In addition to removing bran and germ, the machines 10A, 10B have been found to remove garlic bulbs effectively from the soft wheat, thereby reducing the need to clean the roller mills frequently to remove garlic bulbs.

Output from the second bran removal machine 10B is a pearled wheat which is applied as an input feedstock to the size reduction and further bran removal step described below.

SIZE REDUCTION AND FURTHER BRAN REMOVAL STEP

Figure 5A:
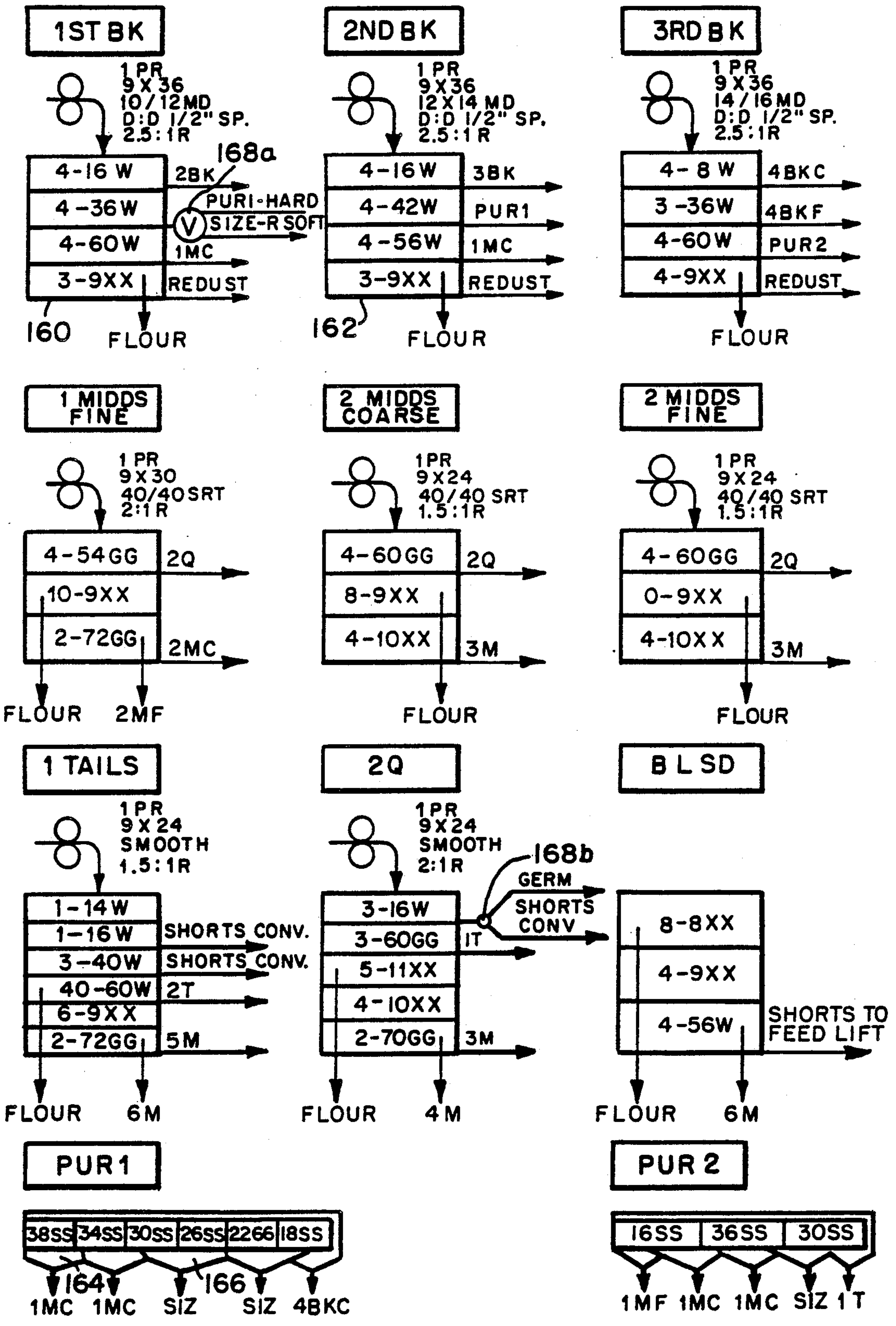
FIGS. 5A through 5C define the roller mills, sifters, purifiers and product flows used in the size reduction and further bran removal step of FIG. 1.
Figure 5B:
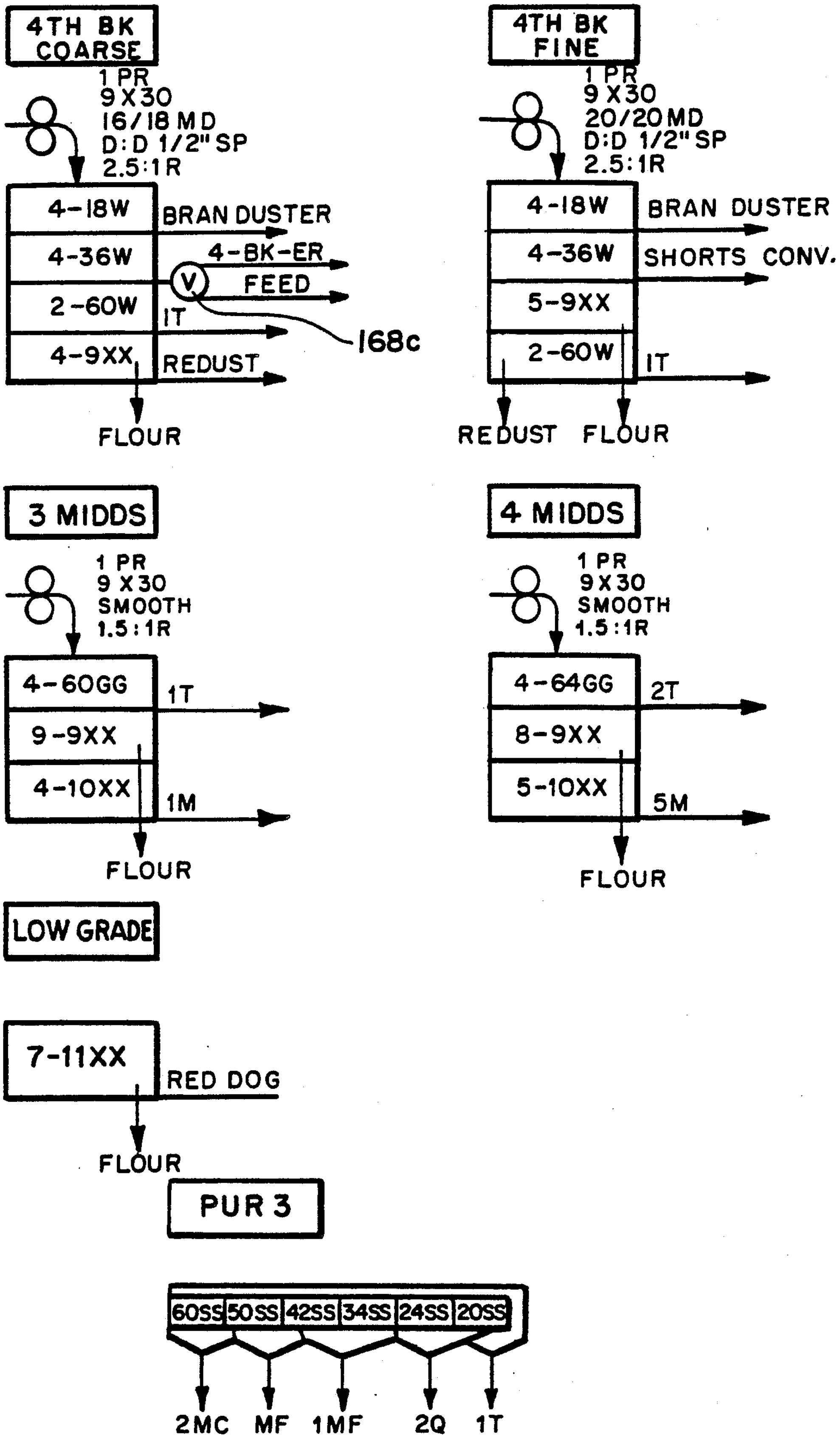
Figure 5C:
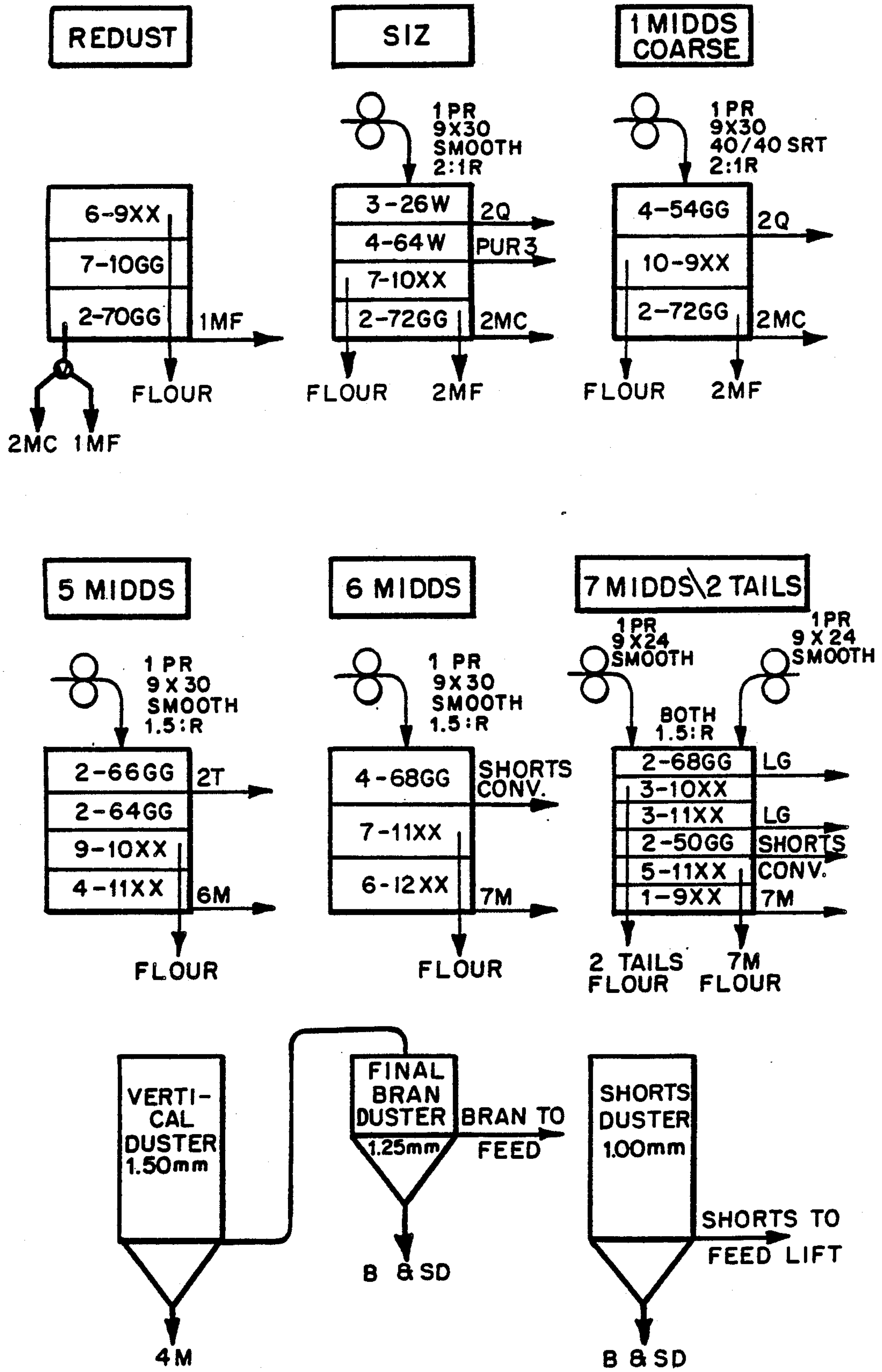

FIGS. 5A–5C define the presently preferred size reduction and further bran removal step in complete detail understandable to one of ordinary skill in the art. These figures represent the primary disclosure of this step, and the following comments are intended merely to clarify the symbols used in those figures.

As shown in FIGS. 5A through 5C, the size reduction and further bran removal step employs roller mills, sifters and purifiers. The pearled wheat product produced by one set of bran removal machines 10A, 10B is supplied at a rate of 180 bushels/hour as an input feedstock to a first break roll shown in FIG. 5A and identified as 1ST BK. As there indicated, the first break roll includes one pair of rolls, each 9 inch in diameter and 36 inches long. These rolls are provided with Modified Dawson (MD) flutes spaced at 10 flutes per inch on the faster roll and 12 flutes per inch on the slower roll. The flutes on the rolls are oriented dull to dull (D:D) and they are arranged in a 1/2 inch spiral cut. The rolls are operated at a differential rotational speed of 2.5 to 1. The remaining roller mills are defined in similar terms in the figures. The symbol "SRT" is used to indicate Stevens Round Top as opposed to Modified Dawson flutes.

The output from the first break rolls 1ST BK is applied to a sifter shown at reference numeral 60. This is a conventional sifter having up to 27 horizontal sieves or screens arranged one above the other. The sieves are formed of grids of cloth of the type identified in the drawings. The codes used here to define the size of the sieves are the standard codes, as defined for example in "Comparative Table of Industrial Screen Fabrics" published by H. R. Williams Mill Supply Company, Kansas City, Mo. In FIG. 5A, the screens in the sifter 60 are identified by a first number which indicates the number of layers in the sifter made up of the indicated screen, a dash, and a second number which defines the screen. For example, in sifter 60 the upper four layers of screen are type 16W. The next four layers of screen in the sifter 60 are type 36W.

Again referring to sifter 60, symbols such as those on the right indicate where the "overs" which fail to pass through the respective screens are directed. For example, overs which fail to pass through the 16W screens are passed to the second break rolls (2ND BK). Symbols such as those used in sifter 60 in connection with FLOUR indicate where the troughs which pass through the screens are directed. For example, in the sifter 60 the troughs which pass through all of the screens including the finest 9XX screens are directed to FLOUR, the roller mill flour output stream.

Additionally, the size reduction and further bran removal step shown in FIGS. 5A–5C includes a set of purifiers PUR1–PUR3. Purifiers such as those shown in these figures are generally conventional and well known to those skilled in the art. The following comments will define the symbols used in describing each of the purifiers, using purifier PUR1 of FIG. 5A by way of example.

Purifier PUR1 receives its feedstock from the sifter 60 (the overs from the 36W screens) and the sifter 62 (the overs from the 42W screens). The purifier PUR1 includes a deck of screens which slope downwardly from left to right and which have screen material as shown. Thus, the screens on the purifier PUR1 have a 38SS screen material at the left and a 18SS screen material at the right. Milled wheat is introduced onto the right hand end of the screen, which is moved in a cyclical fashion. The overs which do not pass through the screen are directed to the fourth break coarse rolls (4TH BK COARSE) of FIG. 5B. The fraction of the incoming stream which passes through the screens is directed to the indicated rolls, depending on the point where the incoming stream passes through the screen. In the diagram for the purifier PUR1 the lower symbols indicate the rolls to which the corresponding fractions are directed. For example, the fraction that falls through the open area 64 is directed to the first midds coarse rolls (1 MIDDS COARSE) as shown in FIG. 5C. Similarly, the fraction that falls through the open area 66 is directed to the sizing rolls (SIZ) of FIG. 5C.

From this description it should be apparent that for each of the purifiers the source of the feedstock, the screen size, and the destination of the overs and the throughs is indicated. Additionally, in the conventional manner an air flow is maintained over the screens to remove bran and germ for processing separately from endosperm.

In order to further define the best mode of this preferred embodiment, the following details are provided regarding the roller mills, sifters and purifiers described above. Of course, these details are provided only by way of example. The roller mills can be any conventional roller mills, such as those manufactured by Allis Chalmers as Type A or equivalent. The sifters can be any conventional sifters such as free swinging sifters distributed by Great Western Manufacturing. If desired, the screens of the sifters may be backed with a layer of $\frac{1}{2}$ inch by $\frac{1}{2}$ inch intercrimped wire mesh mounted about $\frac{3}{4}$ inch below the screen. Five hard rubber balls $\frac{5}{8}$ inch in diameter may be placed in each quadrant on the respective wire mesh to bounce against the overlying screen and keep it clean.

The purifiers are preferably slightly modified version of the Allis Chalmers Type 106 purifier operated at 2000 $ft^3$ cubic feet per minute of air and a screen rotational speed of 450 rpm. The modification of these purifiers relates to the addition of a tray of expanded metal mounted below the deck of screen to move with the deck. Each of these expanded metal trays defines diamonds dimensioned approximately 0.5 inch along the direction of product movement and 1 inch perpendicular to the direction of product movement. The tray is preferably about $\frac{7}{8}$ of an inch below the level of the deck to form a confined area between the expanded metal tray and the overlying deck of screen. This area is divided into three sections along the length of the purifier, and each section confines 27 brown rubber balls about $\frac{5}{8}$ of an inch in diameter, such as those supplied by H. R. Williams. These confined balls bounce between the expanded metal tray and the overlying screen in order to keep the screen clear.

The bran and shorts dusters can for example be of the type distributed by Buhler as the Model MKL duster.

The size reduction and further bran removal step of FIGS. 5A–5C can easily be adjusted for use with either hard or soft wheat. When hard wheat is being milled, the three valves *68a*, *68b*, *68c* are set to the upper position, and when soft wheat is being milled the *68a*, *68b*, *68c* are set to the lower position. For example, the overs from the 36W screen in the sifter 60 are directed to the first purifier PUR1 by the valve *68a* when hard wheat is being milled, and to the sizing rolls SIZ when soft wheat is being milled.

Preferably the separations between the rolls of the roller mills are set to provide the roll extractions set out in Tables II(a) and II(b) for hard and soft wheat, respectively.

TABLE II(a)

EXTRACTION TABLE (Hard Wheat)

| Roll | Weight Percentage Passing Through Selected Sieve | Sieve |
|---|---|---|
| 1st Break | 34% | 18 W |
| 2nd Break | 44% | 18 W |
| 3rd Break | 42% | 18 W |
| 4th Break Cr. | 38% | 20 W |
| 4th Break Fn. | 50% | 20 W |
| Sizings | 48% | 30 W |

TABLE II(b)

EXTRACTION TABLE (Soft Wheat)

| Roll | Weight Percentage Passing Through Selected Sieve | Sieve |
|---|---|---|
| 1st Break | 48% | 18 W |
| 2nd Break | 46% | 18 W |
| 3rd Break | 44% | 18 W |
| 4th Break Cr. | 36% | 20 W |
| 4th Break Fn. | 60% | 20 W |
| Sizings | 55% | 30 W |

In Tables II(a) and II(b), the second column indicates the weight percent of 100 grams of the output of the indicated roller mill that passes through a Great Western test sifter of the screen size indicated in the respective row of the third column, when sifted for one minute.

EXAMPLES

EXAMPLE 1

Figure 6:
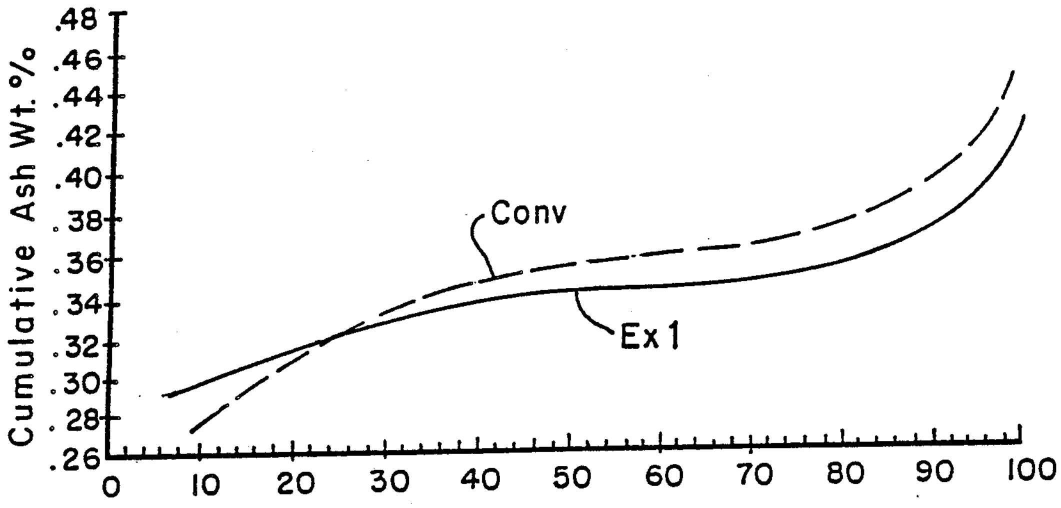

The milling process described above in connection with FIGS. 1-5C was used in a full scale roller mill to process milling quality soft red winter wheat. Tables III(a) and III(b) present cumulative ash data for this example in comparison with cumulative ash data for a conventional roller mill. In Tables III(a) and III(b) cumulative streams are expressed as weight percent of the soft wheat total food grade stream of the mill. FIG. 6 graphs the cumulative ash data of Tables III(a) and III(b).

TABLE III(a)

CUMULATIVE ASH TABLE
SOFT WHEAT - (Example 1)

| Cumulative Wt % Of Total Food Grade Product | Cumulative Wt % Of Ash |
|---|---|
| 5.28 | .289 |
| 12.51 | .302 |
| 15.22 | .307 |
| 23.56 | .321 |
| 40.52 | .335 |
| 49.95 | .340 |
| 57.93 | .342 |
| 71.53 | .348 |
| 76.09 | .350 |
| 78.59 | .352 |
| 82.08 | .355 |
| 83.00 | .357 |
| 87.96 | .369 |
| 88.90 | .372 |
| 90.38 | .376 |
| 92.15 | .379 |
| 92.84 | .382 |
| 94.00 | .387 |
| 97.93 | .412 |
| 98.55 | .417 |
| 99.12 | .426 |
| 100.00 | .448 |

TABLE III(b)

CUMULATIVE ASH TABLE
SOFT WHEAT - (Conventional)

| Cumulative Wt % Of Total Food Grade Product | Cumulative Wt % Of Ash |
|---|---|
| 8.72 | .271 |
| 16.42 | .299 |
| 23.79 | .319 |
| 31.24 | .333 |
| 34.54 | .337 |
| 47.22 | .351 |
| 62.02 | .359 |
| 71.32 | .364 |
| 74.35 | .366 |
| 76.17 | .368 |
| 83.36 | .376 |
| 84.77 | .379 |
| 86.03 | .383 |
| 88.96 | .394 |
| 92.84 | .410 |
| 93.81 | .416 |
| 94.56 | .420 |
| 95.07 | .423 |
| 95.67 | .428 |
| 98.81 | .451 |
| 99.27 | .460 |
| 100.00 | .473 |

The data of Tables III(a) and III(b) are the result of a comparative test. Soft wheat in a bin was divided into two quantities. One (Table III(a)) was milled using the preferred embodiment described above, with the machines 10A, 10B adjusted to remove 6 wt % of the incoming wheat and the valves 68a–68c in the roller mill set for soft wheat. The other (Table III(b)) was milled in the same mill set up in the conventional manner (without pearling machines) to mill soft wheat using the same operating conditions as those previously used to mill soft wheat in routine commercial operations.

FIG. 6 shows that the process of FIGS. 1-5 produces a lower cumulative ash curve than does the conventional process, with a higher fraction of the soft wheat total food grade product classified as soft wheat short patent flour. Additionally, the yield of soft wheat total food grade product (expressed as a fraction of incoming dirty wheat) is higher. Table IV summarizes these results.

TABLE IV

| | Ex. 1 | Conventional Roller Mill |
|---|---|---|
| Soft Wheat Short Patent Stream Yield (wt %) | 55.7 | 33.4 |
| Soft Wheat Total Food Grade Stream Yield (wt %) | 73.28 | 71.03 |
| Ratio Soft Wheat Short Patent Stream/Soft Wheat Total Food Grade Stream | 76% | 47% |

Total yield of Example 1 was over 2 wt % greater than the conventional roller mill, and the percentage of soft wheat short patent product in the soft wheat total food grade stream was increased by over 60%.

EXAMPLE 2

Figure 7:
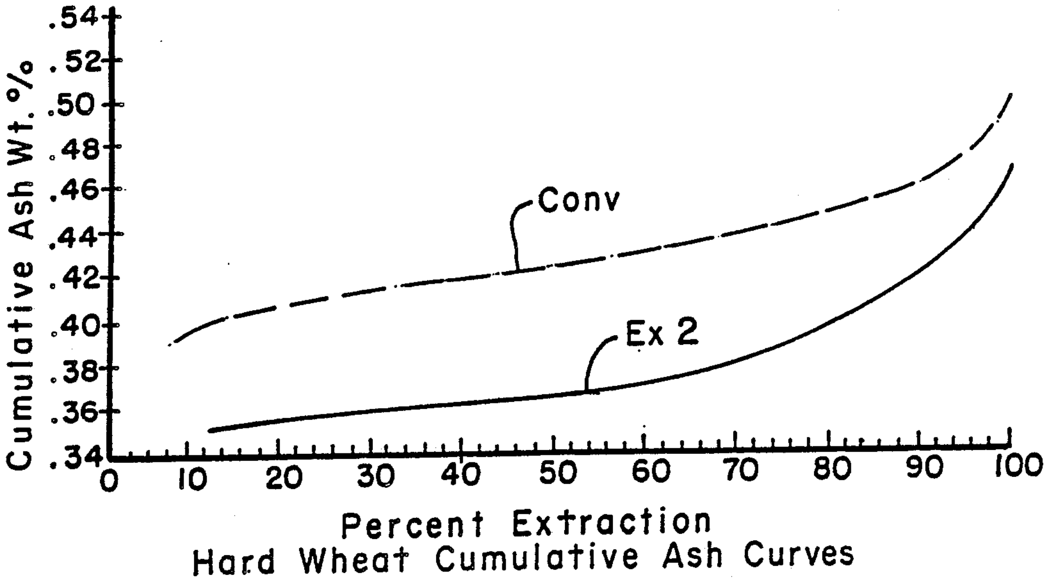

The milling process described above in connection with FIGS. 1-5C was used in a full scale roller mill to process milling quality hard wheat (a mixture of hard red wheat and a small amount of hard red spring wheat). Tables V(a) and V(b) present cumulative ash data for this example in comparison with cumulative ash data for a conventional roller mill. In Tables V(a) and V(b) cumulative streams are expressed as weight percent of the hard wheat total food grade stream of the mill. FIG. 7 graphs the cumulative ash data of Tables V(a) and V(b).

TABLE V(a)

CUMULATIVE ASH TABLE
HARD WHEAT - (Example 2)

| Cumulative Wt % Of Total Food Grade Product | Cumulative Wt % Of Ash |
|---|---|
| 13.71 | .353 |
| 26.01 | .357 |
| 30.11 | .358 |
| 39.62 | .361 |
| 51.56 | .364 |
| 58.04 | .366 |
| 62.33 | .371 |
| 64.10 | .373 |
| 67.08 | .377 |
| 71.70 | .382 |
| 76.74 | .388 |
| 79.67 | .392 |
| 80.98 | .395 |
| 82.99 | .400 |
| 85.97 | .408 |
| 89.42 | .416 |
| 90.35 | .419 |
| 95.29 | .435 |
| 95.74 | .437 |
| 96.67 | .441 |
| 99.05 | .461 |

TABLE V(a)-continued

| CUMULATIVE ASH TABLE HARD WHEAT - (Example 2) | |
|---|---|
| Cumulative Wt % Of Total Food Grade Product | Cumulative Wt % Of Ash |
| 99.98 | .474 |

TABLE V(b)

| CUMULATIVE ASH TABLE HARD WHEAT - (Conventional) | |
|---|---|
| Cumulative Wt % Of Total Food Grade Product | Cumulative Wt % Of Ash |
| 7.87 | .393 |
| 12.66 | .403 |
| 24.77 | .411 |
| 34.09 | .416 |
| 44.67 | .421 |
| 55.65 | .427 |
| 57.73 | .429 |
| 63.67 | .434 |
| 66.74 | .437 |
| 71.09 | .440 |
| 72.68 | .442 |
| 77.36 | .447 |
| 83.29 | .451 |
| 91.99 | .462 |
| 92.23 | .463 |
| 94.45 | .470 |
| 96.72 | .478 |
| 97.41 | .481 |
| 98.11 | .488 |
| 98.72 | .494 |
| 99.44 | .502 |
| 100.00 | .524 |

The data of Tables V(a) and V(b) are the result of a full scale test using hard wheat of the same crop year. Example 2 (Table V(a)) was milled using the preferred embodiment described above, with the machines 10A, 10B adjusted to remove 6 wt % of the incoming wheat and the valves in the roller mill set for hard wheat. Other hard wheat of the same crop year (Table V(b)) was milled in the same mill set up in the conventional manner (without pearling machines) t mill hard wheat using the same operating conditions as those previously used to mill hard wheat in routine commercial operations.

FIG. 7 shows that the process of FIGS. 1-5C produces a lower cumulative ash curve than does the conventional process, with a higher fraction of the hard wheat total food grade product classified as hard wheat medium patent flour. Additionally, the yield of hard wheat total food grade product (expressed as a fraction of incoming dirty wheat) is higher. Table VI summarizes these results.

TABLE VI

| | Ex. 2 | Conventional Roller Mill |
|---|---|---|
| Hard Wheat Total Food Grade Stream Yield (wt %) | 76.07 | 73.39 |
| Ratio Hard Wheat Medium Patent Stream/Hard Wheat Total Food Grade Stream | 97% | 83% |

Total yield of Example 2 was over 2 wt % greater than the conventional roller mill, and the percentage of hard wheat medium patent product in the hard wheat total food grade stream was increased by almost 17%. It should be noted that, when carefully adjusted, the conventional mill used for the data of Table V(b) has produced yields as high as 74.49% in processing hard wheat of the same crop year as the wheat of Tables V(a) and V(b).

The milling process of FIGS. 1-5C has been shown to have an increased yield and throughput with reduced capital and energy costs as compared with the conventional roller mill it replaced.

This yield improvement was obtained without any offsetting decrease in the quality of the milled wheat product. As discussed below in Example 3, chemical analysis and food tests have shown that soft and hard wheat products milled in accordance with this invention are equal to conventionally milled wheat products.

EXAMPLE 3

A quantity of milling quality soft red winter wheat was divided into two batches. Batch 3A was milled as described above in connection with FIGS. 1-5C, and Batch 3B was milled in a conventional roller mill. Aleurone cell wall fragments and pericarp in flour, expressed as percent of measured area, and ash content were measured for Batches 3A and 3B, and the results are shown in Table IV.

TABLE VII

| | Ash Content (wt %) | Measured Aleurone Fluorescence Area (Mean Area %) Divided By Ash Content (wt %) | Measured Pericarp Fluorescence Area (Mean Area %) Divided By Ash Content (wt %) | % Increase (Aleurone) |
|---|---|---|---|---|
| Batch 3A | | | | |
| Patent Flour | 0.414 | 5.14 | 3.24 | 22% |
| Straight Flour | 0.448 | 6.21 | 3.24 | 10% |
| Batch 3B | | | | |
| Patent Flour | 0.411 | 4.21 | 4.45 | |
| Straight Flour | 0.473 | 5.62 | 6.38 | |

In Table VII, straight flour is a combination of patent and clear flour and corresponds to the total food grade flour of the mill. The following measurement protocol was used to obtain the measured aleurone fluorescence areas of Table VII.

1. Ten replicates of approximately 1 G of flour were drawn from each of the four flour samples and prepared for fluorescence analysis using reflectance optics:

a. Each flour sub-sample was placed on a clean glass microscope slide, compressed to uniform thickness of at least 3 mm, and mounted on the scanning stage of a UMSP80 microspectrophotometer (Carl Zeiss Ltd, New York).
b. Each sub-sample was illuminated at 365 nm using a 100 W mercury illuminator (Osram HBO 100) and fluorescence filter set as described by D. W. Irving, R. G. Fulcher, M. M. Bean and R. M. Saunders "Differentiation of wheat based on fluorescence, hardness, and protein", *Cereal Chemistry,* 66(6): 471–477 (1989). In these conditions, aleurone cell walls are highly fluorescent at approximately 450 nm, while the non-aleurone flour fragments are relatively non-fluorescent.
c. The UMSP80 was used to illuminate the specimens using top surface or epi-illumination of each sample. This required use of a specific epi-illuminating filter set comprised of an excitation filter (365 nm max trans, see above), a dichroic mirror (trans max=395 nm) which reflects excitation illumination from the HBO 100 illuminator to the surface of the specimen, and a barrier filter which transmits all fluorescent light above 420 nm to the detector.
d. The UMSP80 was equipped with a 10X Neofluar objective (Carl Zeiss Ltd), and fluorescent light was transmitted to a photomultiplier through a 0.63 mm pinhole mounted above the specimen. The instrument was also equipped with a computer-controlled scanning stage which allowed the operator to move the specimen step-wise under the illumination and measuring pin-hole such that fluorescence measurements were obtained over a predefined matrix over the surface of each specimen. For this analysis the scanning stage was programmed (using the proprietary software "MAPS" from Carl Zeiss Ltd) to obtain fluorescence intensity values at 40 micrometer×60 micrometer intervals over a 28.5 square mm area. This resulted in approximately 12,000 data points, or pixels, per sub-sample of flour. The data shown above therefore represent approximately 120,000 pixels per mean value.
e. In order to standardize the measurement procedure, a stable, fluorescent, uranyl glass filter (GG17, Carl Zeiss Ltd) was placed at a fixed distance from the front surface of the Neofluar objective. The photomultiplier was then calibrated to the standard as 100% fluorescence intensity, and fluorescence of each pixel of the flour samples was measured and recorded relative to the GG17 standard.
f. The measurement procedure generated a digitized image of the fluorescence intensities over the area scanned. Aleurone cell wall fragments typically had very high values (greater than 70–80% relative fluorescence intensity), while non-aleurone material had very little fluorescence (typically 10–60% relative fluorescence intensity). Consequently, all images were inspected and a threshold value (80% relative fluorescence intensity) was applied to allow computer-aided identification and quantitation of aleurone fragments as a percentage of the entire scanned matrix. This value, the "measured aleurone fluorescence area" was taken as a quantitative measure of aleurone cell wall fragments in the sub-sample.

Table VII shows that soft wheat milled in accordance with the presently preferred embodiment of this invention (Batch 3A) has a higher content of aleurone cell wall fragments for a given ash content. In general Batch 3A has a measured aleurone fluorescence area which is about 10–20% greater than that of Batch 3B for each of the two grades. Increased retention of the aleurone layer is believed to be a factor in the yield improvements discussed in Example 1 above. Additionally, Batch 3A shows a higher ratio of measured aleurone fluorescence area to measured pericarp fluorescence area than does Batch 3B.

Batches 3A and 3B were chemically analyzed in the conventional manner for moisture content, ash content, protein, brightness, and rheological properties. Additionally, comparative food tests were performed to assess cookie and cake baking properties. These tests confirmed that in general the flour of Batch 3A was comparable to the flour of Batch 3B, and that each could be substituted for the other within a grade without any significant difference.

EXAMPLE 4

A quantity of milling quality hard wheat (a mixture of hard red wheat and a small amount of hard red spring wheat) was divided into two batches. Batch 4A was milled as described above in connection with FIGS. 1–5C, and Batch 4B was milled in a conventional roller mill. Aleurone cell wall fragments and percarp in flour, expressed as a percent of measured area, and ash content were measured for Batches 4A and 4B (using the procedures discussed above in Example 3), and the results are shown in Table VIII.

TABLE VIII

| | Ash Content (wt %) | Measured Aleurone Fluorescence Area (Mean Area %) Divided By Ash Content (wt %) | Measured Pericarp Fluorescence Area (Mean Area %) Divided By Ash Content (wt %) | % Increase (Aleurone) |
|---|---|---|---|---|
| Batch 4A | | | | |
| Patent Flour | .448 | 4.15 | 2.75 | 43% |
| Straight Flour | .504 | 5.46 | 3.23 | 48% |
| Batch 4B | | | | |
| Patent Flour | .478 | 2.91 | 3.62 | |
| Straight Flour | .524 | 3.70 | 6.72 | |

In Table VIII, straight flour is a combination of patent and clear flour and corresponds to the total food grade flour of the mill.

Table VIII shows that hard wheat milled in accordance with the presently preferred embodiment of this invention (Batch 4A) has a higher content of aleurone cell wall fragments for a given ash content. In general, Batch 4A has a measured aleurone fluorescence area which is about 40-50% greater than that of Batch 4B for each of the two grades. Increased retention of the aleurone layer is believed to be a factor in the yield improvements discussed in Example 2 above. Additionally, Batch 4A shows a higher ratio of measured aleurone fluorescence area to measured pericarp fluorescence area than does Batch 4B.

Chemical analysis (Moisture, Ash, Protein and Rheology) and food tests (Baking) of the type described in Example 3 confirmed that in general the flour of Batch 4A was comparable to the flour of Batch 4B, and each could be substituted for the other within a grade without an significant difference.

Of course, it should be understood that a wide range of changes and modifications can be made to the preferred embodiments described above. Wheat cleaning steps can be varied as appropriate, and the bran removal machines may be altered as long as adequate bran removal and throughput are obtained. The roller mill may also be modified as appropriate for other applications. It is therefore intended that the foregoing description be regarded as illustrative rather than limiting, and that it be understood that it is the following claims, including all equivalents, which are intended to define the scope of this invention.

I claim:

1. A process for milling soft wheat comprising the following steps:

a) providing a quantity of milling quality soft wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat;

c) tempering the wheat prior to completion of step (b); then d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is operative to retain a substantial portion of the aleurone layer with the endosperm after step (b).

2. The process of claim 1 wherein a sufficient portion of the outer bran layers is removed in step (b) to cause the finely divided final product to constitute at least 72.5 wt % of the quantity of wheat and to have an ash content no greater than about 0.45±0.02 wt %.

3. The process of claim 1 wherein a sufficient portion of the outer bran layers is removed in step (b) to cause the finely divided final product to constitute at least 73 wt % of the quantity of wheat and to have an ash content no greater than about 0.45±0.02 wt %.

4. The process of claim 1 wherein the finely divided final product is a soft wheat total food grade stream which comprises a soft wheat short patent stream, and wherein a sufficient portion of the outer bran layers is removed in step (b) to cause the ratio of (1) the weight of the soft wheat short patent stream to (2) the weight of the soft wheat total food grade stream to exceed 50%.

5. The process of claim 1 wherein the finely divided final product is a soft wheat total food grade stream which comprises soft wheat short patent stream, and wherein a sufficient portion of the outer bran layers is removed in step (b) to cause the ratio of (1) the weight of the soft wheat short patent stream to (2) the weight of the soft wheat total food grade stream to exceed 60%.

6. The process of claim 1 wherein the finely divided final product a soft wheat total food grade stream which comprises a soft wheat short patent stream, and wherein a sufficient portion of the outer bran layers is removed in step (b) to cause the ratio of (1) the weight of the soft wheat short patent stream to (2) the weight of the soft wheat total food grade stream to exceed 70%.

7. The process of claim 1 wherein the finely divided final product is a soft wheat total food grade stream which comprises soft wheat short patent stream, and wherein a sufficient portion of the outer bran layers is removed in step (b) to cause the ratio of (1) the weight of the soft wheat short patent stream to (2) the weight of the soft wheat total food grade stream to exceed 75%.

8. The process of claim 1 wherein the finely divided final product comprises a flour.

9. The process of claim 1 wherein at least about 6% of the weight of the wheat is removed in step (b), before step (d).

10. The process of claims 1 or 2 or 4 wherein more than one half of the germ is removed from the wheat in step (b), before step (d).

11. The process of claims 1 or 2 or 4 wherein step (b) is performed at a rate greater than about 80 bushels per hour of wheat per pair of sets of abrasive elements.

12. The process of claim 1 wherein step (b) is performed at a rate greater than about 150 bushels per hour of wheat per pair of sets of abrasive elements.

13. The process of claims 1 or 2 or 4 wherein step (b) comprises the step of passing the wheat vertically upwardly between the two sets of abrasive elements.

14. The process of claim 1 further comprising the step of providing the abrasive elements each with a respective toothed surface positioned to contact the wheat.

15. The process of claim 14 wherein each toothed surface comprises a plurality of teeth, and wherein each tooth defines a sharp face and a dull face, said sharp face oriented more nearly perpendicular to the opposing abrasive element.

16. The process of claim 15 further comprising the step of arranging the abrasive elements such that a sharp face on one abrasive element approaches a dull face of another abrasive element as the abrasive elements are moved with respect to one another in step (b).

17. The process of claim 1 wherein the final product has a ratio of (1) measured aleurone fluorescence area to (2) ash content (wt %) no less than about 4.5 and an ash content no greater than about 0.42 wt %.

18. The process of claim 1 wherein the final product has a ratio of (1) measured aleurone fluorescence area to (2) ash content (wt %) greater than about 5.9 and an ash content no greater than about 0.47 wt %.

19. The process of claim 1 wherein step (b) comprises the steps of (b1) passing the wheat between two first sets of abrasive elements while flowing a gas through the wheat and moving the two first sets of abrasive elements with respect to another; and then (b2) passing the wheat between two second sets of abrasive elements while flowing a gas through the wheat and moving the two second sets of abrasive elements with respect to one another.

20. The process of claim 19 wherein step (c) comprises the step of tempering the wheat between steps (b1) and (b2).

21. A process for milling hard wheat comprising the following steps:

a) providing a quantity of milling quality hard wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b); then d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is operative to retain a substantial portion of the aleurone layer with the endosperm after step (b).

22. The process of claim 21 wherein a sufficient portion of the outer bran layers is removed in step (b) to cause the finely divided final product to constitute at least 75 wt % of the quantity of wheat and to have an ash content no greater than about 0.52 wt %.

23. The process of claim 21 wherein a sufficient portion of the outer bran layers is removed in step (b) to cause the finely divided final product to constitute at least 76 wt % of the quantity of wheat and to have an ash content no greater than about 0.52 wt %.

24. The process of claim 21 wherein the finely divided final product is a hard wheat total food grade stream which comprises a hard wheat medium patent stream, and wherein a sufficient portion of the outer bran layers is removed in step (b) to cause the ratio of the weight of the hard wheat medium patent stream to the weight of the hard wheat total food grade stream to exceed 85%.

25. The invention of claim 21 wherein the finely divided final product is a hard wheat total food grade stream which comprises a hard wheat medium patent stream, and wherein a sufficient portion of the outer bran layers is removed in step (b) to cause the ratio of the weight of the hard wheat medium patent stream to the weight of the hard wheat total food grade stream to exceed 90%.

26. The invention of claim 21 wherein the finely divided final product is a hard wheat total food grade stream which comprises a hard wheat medium patent stream, and wherein a sufficient portion of the outer bran layers is removed in step (b) to cause the ratio of the weight of the hard wheat medium patent stream to the weight of the hard wheat total food grade stream to exceed 95%.

27. The process of claim 21 wherein the finely divided final product comprises a flour.

28. The process of claim 21 wherein at least about 6% of the weight of the wheat is removed in step (b), before step (d).

29. The process of claims 21 or 22 or 25 wherein more than one half of the germ is removed from the wheat in step (b), before step (d).

30. The process of claims 21 or 22 or 25 wherein step (b) is performed at a rate greater than about 80 bushels per hour of wheat per pair of sets of abrasive elements.

31. The process of claim 21 wherein step (b) is performed at a rate greater than about 150 bushels per hour of wheat per pair of sets of abrasive elements.

32. The process of claims 21 or 22 or 25 wherein step (b) comprises the step of passing the wheat vertically upwardly between the two sets of abrasive elements.

33. The process of claim 21 further comprising the step of providing the abrasive elements each with a respective toothed surface positioned to contact the wheat.

34. The process of claim 33 wherein each toothed surface comprises a plurality of teeth, and wherein each tooth defines a sharp face and a dull face, said sharp face oriented more nearly perpendicular to the opposing abrasive element.

35. The process of claim 34 further comprising the step of arranging the abrasive elements such that a sharp face on one abrasive element approaches a dull face of another abrasive element as the abrasive elements are moved with respect to one another in step (b).

36. The process of claim 21 wherein the final product has a ratio of (1) measured aleurone fluorescence area to (2) ash content (wt %) no less than about 3.2 and an ash content no greater than about 0.47 wt %.

37. The process of claim 21 wherein the final product has a ratio of (1) measured aleurone fluorescence area to (2) ash content (wt %) greater than about 4.2 and an ash content no greater than about 0.52 wt %.

38. The process of claim 21 wherein step (b) comprises the steps of (b1) passing the wheat between two first sets of abrasive elements while flowing a gas through the wheat and moving the two first sets of abrasive elements with respect to another; and then (b2) passing the wheat between two second sets of abrasive elements while flowing a gas through the wheat and moving the two second sets of abrasive elements with respect to one another.

39. The process of claim 38 wherein step (c) comprises the step of tempering the wheat between steps (b1) and (b2).

40. The process of claims 1 or 2 or 4 wherein step (c) is completed before step (b) is begun.

41. The process of claim 19 wherein step (d) follows directly after step (b2) such that step (b) consists essentially of steps (b1) and (b2).

42. The process of claim 1 wherein step (b) comprises the step of passing the wheat consecutively through no more than two stages of bran removal, each stage comprising at least one respective pair of the sets of abrasive elements.

43. The process of claim 42 wherein step (b) comprises the step of passing the wheat vertically between the sets of abrasive elements in each stage of bran removal.

44. The process of claim 43 wherein each stage of bran removal is performed at a rate greater than about 70 bushels of wheat per hour per pair of sets of abrasive elements.

45. A process for milling soft wheat comprising the following steps:

a) providing a quantity of milling quality soft wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that the final product has a ratio of (1) measured aleurone fluorescence areas to (2) ash content (wt %) no less than about 4.5 and an ash content no greater than about 0.42 wt %.

46. The process of claim 45 wherein the finely divided final product is a soft wheat total food grade stream which comprises a soft wheat short patent stream, and wherein a sufficient portion of the outer bran layers is removed in step (b) to cause the ratio of (1) the weight of the soft wheat short patent stream to (2) the weight of the soft wheat total food grade stream to exceed 70%.

47. A process for milling soft wheat comprising the following steps:

a) providing a quantity of milling quality soft wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that the final product has a ratio of (1) measured aleurone fluorescence areas to (2) ash content (wt %) no less than about 5.9 and an ash content no greater than about 0.47 wt %.

48. The process of claim 47 wherein the finely divided final product is a soft wheat total food grade stream which comprises a soft wheat short patent stream, and wherein a sufficient portion of the outer bran layers is removed in step (b) to cause the ratio of (1) the weight of the soft wheat short patent stream to (2) the weight of the soft wheat total food grade stream to exceed 70%.

49. The process of claim 47 wherein a sufficient portion of the outer bran layers is removed in step (b) to cause the finely divided final product to constitute at least 72.5 wt % of the quantity of wheat and to have an ash content no greater than about 0.45±0.02 wt %.

50. The process of claim 47 wherein a sufficient portion of the outer bran layers is removed in step (b) to cause the finely divided final product to constitute at least 73 wt % of the quantity of wheat and to have an ash content no greater than about 0.45±0.02 wt %.

51. A process for milling soft wheat comprising the following steps:

a) providing a quantity of milling quality soft wheat having an endosperm and germ surrounded by a plurality of bran layers;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) progressively reducing the average size of the pearled wheat by passing the pearled wheat through a sequence of multiple roller mills to form a finely divided final product at a plurality of roller mills in the sequence; and d) removing additional portions of the remaining bran layers during step (c);

wherein step (b) comprises the step of passing the wheat vertically between the two sets of abrasive elements.

52. The process of claim 51 wherein step (b) comprises the steps of (b1) passing the wheat between two first sets of abrasive elements while flowing a gas through the wheat and moving the two first sets of abrasive elements with respect to another; and then (b2) passing the wheat between two second sets of abrasive elements while flowing a gas through the wheat and moving the two second sets of abrasive elements with respect to one another.

53. The process of claim 52 wherein steps (b1) and (b2) define two consecutive bran removal stages, and wherein these two bran removal stages are the only consecutive bran removal stages of step (b).

54. The process of claim 51 wherein a sufficient portion of the outer bran layers is removed in step (b) to cause the finely divided final product to constitute at least 73 wt % of the quantity of wheat and to have an ash content no greater than about 0.45±0.02 wt %.

55. The process of claim 51 wherein the finely divided final product is a soft wheat total food grade stream which comprises a soft wheat short patent stream, and wherein a sufficient portion of the outer bran layers is removed in step (b) to cause the ratio of (1) the weight of the soft wheat short patent stream to (2) the weight of the soft wheat total food grade stream to exceed 70%.

56. The process of claim 51 wherein step (b) is performed at a rate greater than about 80 bushels per hour of wheat per pair of sets of abrasive elements.

57. The process of claim 51 wherein step (b) is performed at a rate greater than about 150 bushels per hour of wheat per pair of sets of abrasive elements.

58. A process for milling soft wheat comprising the following steps:

a) providing a quantity of milling quality soft wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that the finely divided final product is a soft wheat total food grade stream which comprises a soft wheat short patent stream, and wherein a sufficient portion of the outer bran layers is removed in step (b) to cause the ratio of (1) the weight of the soft wheat short patent stream to (2) the weight of the soft wheat total food grade stream to exceed 70%.

59. A process for milling hard wheat comprising the following steps:

a) providing a quantity of milling quality hard wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that the final product has a ratio of (1) measured aleurone fluorescence areas to (2) ash content (wt %) area no less than about 3.2 and an ash content no greater than about 0.47 wt %.

60. The process of claim 59 wherein the finely divided final product is a hard wheat total food grad stream which comprises a heard wheat medium patent stream, and wherein a sufficient portion of the outer bran layers is removed in step (b) to cause the ratio of the weight of the hard wheat medium patent stream to the weight of the hard wheat total food grade stream to exceed 90%.

61. A process for milling hard wheat comprising the following steps:

a) providing a quantity of milling quality hard wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that the final product has a ratio of (1) measured aleurone fluorescence areas to (2) ash content (wt %) greater than about 4.2 and an ash content no greater than about 0.52 wt %.

62. The process of claim 61 wherein a sufficient portion of the outer bran layers is removed in step (b) to cause the finely divided final product to constitute at least 75 wt % of the quantity of wheat and to have an ash content no greater than about 0.52 wt %.

63. The process of claim 61 wherein the finely divided final product is a hard wheat total food grade stream which comprises a hard wheat medium patent stream, and wherein a sufficient portion of the outer bran layers is removed in step (b) to cause the ratio of the weight of the hard wheat medium patent stream to the weight of the hard wheat total food grade stream to exceed 90%.

64. A process for milling hard wheat comprising the following steps:

a) providing a quantity of milling quality hard wheat having an endosperm and germ surrounded by a plurality of bran layers;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) progressively reducing the average size of the pearled wheat by passing the pearled wheat through a sequence of multiple roller mills to form a finely divided final product at a plurality of roller mills in the sequence; and d) removing additional portions of the remaining bran layers during step (c);

wherein step (b) comprises the step of passing the wheat vertically between the two sets of abrasive elements.

65. The process of claim 64 wherein step (b) comprises the steps of (b1) passing the wheat between two first sets of abrasive elements while flowing a gas through the wheat and moving the two first sets of abrasive elements with respect to another; and then (b2) passing the wheat between two second sets of abrasive elements while flowing a gas through the wheat and moving the two second sets of abrasive elements with respect to one another.

66. The process of claim 65 wherein step (b1) and (b2) define two consecutive bran removal stages, and wherein these two bran removal stages are the only consecutive bran removal stages of step (b).

67. The process of claim 64 wherein a sufficient portion of the outer bran layers is removed in step (b) to cause the finely divided final product to constitute at least 75 wt % of the quantity of wheat and to have an ash content no greater than about 0.52 wt %.

68. The process of claim 64 wherein the finely divided final product is a hard wheat total food grade stream which comprises a hard wheat medium patent stream, and wherein a sufficient portion of the outer bran layers is removed in step (b) to cause the ratio of the weight of the hard wheat medium patent stream to the weight of the hard wheat total food grade stream to exceed 90%.

69. The process of claim 64 wherein step (b) is performed at a rate greater than about 80 bushels of wheat per hour per pair of sets of abrasive elements.

70. The process of claim 64 wherein step (b) is performed at a rate greater than about 150 bushels of wheat per hour per pair of sets of abrasive elements.

71. A process for milling hard wheat comprising the following steps:

a) providing a quantity of milling quality hard wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that the finely divided final product is a hard wheat total food grade stream which comprises a hard wheat medium patent stream, and wherein a sufficient portion of the outer bran layers is removed in step (b) to cause the ratio of the weight of the hard wheat medium patent stream to the weight of the hard wheat total food grade stream to exceed 90%.

72. A process for milling hard wheat comprising the following steps:

a) providing a quantity of milling quality hard wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that a sufficient portion of the outer bran layers is removed in step (b) to cause the finely divided final product to constitute at least 75 wt % of the quantity of wheat and to have an ash content no greater than about 0.52 wt %.

73. The process of claims 21 or 22 or 25 wherein step (c) is completed before step (b) is begun.

74. The process of claim 38 wherein step (d) follows directly after step (b2) such that step (b) consists essentially of steps (b1) and (b2).

75. The process of claim 21 wherein step (b) comprises the step of passing the wheat consecutively through no more than two stages of bran removal, each stage comprising at least one respective pair of the sets of abrasive elements.

76. The process of claim 75 wherein step (b) comprises the step of passing the wheat vertically between the sets of abrasive elements in each stage of bran removal.

77. The process of claim 76 wherein each stage of bran removal is performed at a rate greater than about 70 bushels of wheat per hour per pair of sets of abrasive elements.

78. The process of claim 51 wherein step (b) comprises the step of rotating one of the two sets of abrasive elements with respect to the other about a substantially vertical axis.

79. The process of claim 64 wherein step (b) comprises the step of rotating one of the two sets of abrasive elements with respect to the other about a substantially vertical axis.

* * * * *

UNITED STATES PATENT AND TRADEMARK OFFICE
CERTIFICATE OF CORRECTION

PATENT NO. : 5,104,671

DATED : April 14, 1992

INVENTOR(S) : Warner Wellman

It is certified that error appears in the above-identified patent and that said Letters Patent is hereby corrected as shown below:

Column 2, under the heading "OTHER PUBLICATIONS", in the eleventh line, please delete "Converence," and substitute therefor --Conference,--.

Page 2, Column 1, under the heading "OTHER PUBLICATIONS", in the seventh line, please delete "Ceral" and substitute therefor --Cereal--.

Page 2, under the heading "OTHER PUBLICATIONS", please add: --Translation of article from Getreide Mehl und Brot, June 1983, pp. 185-189, "Investigations on the Behavior of the Microflora of Durum Wheat During Scouring," by G. Spicher and H. Zwingelberg.--

Column 4, line 57, delete ".60" and substitute therefor --.50--.

Column 10, line 27, before "68*a*," please insert --three valves--.

UNITED STATES PATENT AND TRADEMARK OFFICE
CERTIFICATE OF CORRECTION

PATENT NO. : 5,104,671

DATED : April 14, 1992

INVENTOR(S) : Warner Wellman

It is certified that error appears in the above-identified patent and that said Letters Patent is hereby corrected as shown below:

Column 13, line 41, delete "t mill" and substitute therefor --to mill--.

Column 17, line 18, delete "an" and substitute therefor --any--.

Col. 6, Claim 6, line 2, after "product" please insert --is--.

Col. 21, Claim 47, line 29, delete "less" and substitute therefor --greater--.

Col. 24, Claim 60, line 2, delete "grad" and substitute therefor --grade--.

Claim 60, line 3, delete "heard" and substitute therefor --hard--.

Signed and Sealed this

Twenty-sixth Day of April, 1994

Attest:

Bruce Lehman

BRUCE LEHMAN

*Attesting Officer*

*Commissioner of Patents and Trademarks*